United States Patent Office 3,326,658
Patented June 20, 1967

3,326,658
METHOD FOR CONTROLLING PLANT GROWTH
Howard E. Harris, Bloomfield, and Hershel L. Herzog, Wayne Township, Passaic County, N.J., assignors to Schering Corporation, Bloomfield, N.J., a corporation of New Jersey
No Drawing. Filed Jan. 28, 1964, Ser. No. 340,828
7 Claims. (Cl. 71—2.3)

This invention relates to the art of killing weeds, and more particularly it relates to a process and composition for selectively eradicating noxious plants.

In its composition of matter aspect this invention relates to herbicidal compositions having as an active ingredient thereof, a 4-hydroxybenzonitrile having in its 3-position a saturated hydrocarbyl having up to twelve carbon atoms.

In its process aspect, this invention relates to the process for controlling plant growth which comprises applying to the locus in which said plant is grown, in amounts sufficient to exert herbicidal action, a 4-hydroxybenzonitrile having in its 3-position a saturated hydrocarbyl having up to twelve carbon atoms.

The principal object of the present invention is the provision of herbicidal compositions and processes which possess exceptionally high pre-emergence activity and which are selective in their action against weeds which are common problems in commercial crops.

The present invention is based upon the discovery that effective control can be obtained over noxious plants growing among economical crops provided such crops, or the area wherein they are grown, are treated with a herbicidally effective amount of a compound selected from the class consisting of 3-saturated hydrocarbyl-4-hydroxybenzonitrile, 3,5-di-saturated hydrocarbyl-4-hydroxybenzonitrile, wherein said hydrocarbyls contains from one to twelve carbon atoms, the agriculturally acceptable salts thereof, and the lower alkyl ethers and the lower alkanoyl esters of said hydroxybenzonitriles.

As used herein the terms "3-saturated hydrocarbyl-4-hydroxybenzonitriles" and "3,5-di-saturated hydrocarbyl-4-hydroxybenzonitriles" mean those 4-hydroxybenzonitriles, the saturated hydrocarbon radials of which have 1–12 carbon atoms, including the straight and branched-chain radicals, among which are, for purpose of illustration but within limiting the generality of the foregoing, methyl, ethyl, propyl, isopropyl, n-butyl, t-butyl, isoamyl, hexyl, octyl, decyl, dodecyl, cyclohexylbutyl, cyclohexlpropyl, cyclopentylpropyl and the cyclized radicals such as cyclopropyl, cyclobutyl, cyclopentyl, cyclohexyl.

The term "pre-mergence" as used in this application refers to the agronomic practice of applying a herbicidal agent to the soil or growth media prior to emergence of the weeds sought to be controlled. The term connotes a stage of treatment relative to the state of growth of the weeds, not of the crops. Thus this term, as used herein, encompasses applications of herbicidal agents to soil or growth media (1) prior to emergence of either the weed species sought to be controlled or the desirable crop, and (2) prior to emergence of the weed species but after emergence of the economic crop.

From a consideration of their chemical structure it is apparent that the hydrocarbyl substituted 4-hydroxybenzonitriles of the present invention are acidic in nature by virtue of the phenolic hydroxyl group and, therefore, will undergo certain salt formation. Such salts lend themselves to greater ease of formulation as compared to the free hydroxybenzonitrile.

These salts, following application to the locus to be treated, are believed to dissociate and/or hydrolyze to the free hydroxybenzonitrile and thus it is the free hydroxybenzonitrile which is responsible for the herbicidal activity thereafter observed. It is thus contemplated as within the purview of this invention to include such salts, hereinafter defined as "agriculturally acceptable salts," as substantial equivalents of the free hydroxybenzonitrile.

By the term "agriculturally acceptable salts" is meant those salts which are used in agricultural formulations and which do not create any differences in kind of herbicidal activity from that shown by the free hydroxybenzonitrile. These salts themselves do not change the characteristic application of the free hydroxybenzonitrile, but merely facilitate application or formulation of the compounds as useful herbicides by increasing solubility in vehicles such as oil, water or oil-water emulsions and the like. The salts may provide for additionally greater elegance in formulation by allowing for greater dispersibility, contact adhesence, spreadability, resistance to weathering, and the like.

Typical of the various types of agriculturally acceptable salts suitable for formulation purposes are those formed with ammonia, alkali metals, heavy metals, alkyl and alkanol amines, and certain imidazolines represented by the structural formula:

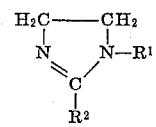

wherein $R^2$ is an alkyl radical containing from 1 to 8 carbon atoms, and $R^1$ is selected from the group consisting of H, OH and —$CH_2CH_2NH_2$.

Exemplary of the preferred foregoing types of agriculturally acceptable salts preparable from the hydrocarbyl substituted 4-hydroxybenzonitriles of this invention are such alkali and heavy meal salts as lithium, sodium, potassium and ammonium salts and copper, iron, zinc and cadmium salts. It should be noted that innumerable alkyl and alkanol amine salts may be synthesized. However, it is preferred to use those primary, secondary and tertiary alkyl and alkanol amines wherein the hydrocarbyl moiety may be straight or branched chain radicals having from 1 to about 30 total carbon atoms, such as for example methyl amine, ethyl amine, diethyl amine, trimethyl amine, trioctyl amine, tridecyl amine and the commercially available mixtures of primary amines, such as those branched chain amines having a molecular formula of $C_nH_{2n+1}NH_2$, wherein $n=12$–$14$ and $18$–$22$, as well as the corresponding alkanol amines.

Insofar as the alkyl ethers and alkanoyl esters are concerned it is of course quite possible to form a rather large number and variety of such derivatives which will be suitable for formulation purposes. However in practice it is generally preferred to prepare lower alkyl ethers and lower alkanoyl esters. With this preference in mind it is to be understood that such other ether and ester derivatives will, in essence, be the full equivalent of the lower alkanoyl ester and the lower alkyl ethers and as such are contemplated as being fully embraced herein. The term "lower" of "lower alkanoyl" and "lower alkyl" is used to designate those hydrocarbon chains having from one to six carbon atoms.

Typical of the preferred hydrocarbyl-substituted hydroxybenzonitriles, their salts and derivatives, included within the scope of this invention are those which are hereinbelow set forth:

3,5-diethyl-4-hydroxybenzonitrile
3,5-diisopropyl-4-hydroxybenzonitrile
3,5-dietertiarybutyl-4-hydroxybenzonitrile
3-methyl-4-tertiarybutyl-4-hydroxybenzonitrile 3,5-ditertiaryamyl-4-hydroxybenzonitrile
3-methyl-5-isopropyl-4-hydroxybenzonitrile
3-ethyl-5-isohexyl-4-hydroxybenzonitrile
Ammonium salt of 3,5-dimethyl-4-hydroxybenzonitrile
Sodium salt of 3,5-ditertiarybutyl-4-hydroxybenzonitrile
Lithium salt of 3,5-ditertiarybutyl-4-hydroxybenzonitrile
Dimethylamine salt of 3-isopropyl-4-hydroxybenzonitrile
Trimethylamine salt of 3-methyl-5-tertiarybutyl-4-hydroxybenzonitrile
Diethanolamine salt of 3,5-diethyl-4-hydroxybenzonitrile
Diisopropanolamine salt of 3,5-diisohexyl-4-hydroxybenzonitrile
Monomethylamine salt of 3-isopropyl-5-tertiarybutyl-4-hydroxybenzonitrile
Branched chain octylamine salt of 3,5-diisopropyl-4-hydroxybenzonitrile
Mixed amine salts composed of branched-chain amines having a molecular formula of $C_nH_{2n+1}NH_2$, wherein $n=12-14$ of 3,5-ditertiarybutyl-4-hydroxybenzonitrile
2-i-propyl-1-(2-aminoethyl)-imidazoline salt of 3,5-diethyl-4-hydroxybenzonitrile
2-ethylimidazoline salt of 3,5-diethyl-4-hydroxybenzonitrile
Imidazoline salt of 3,5-ditertiarybutyl-4-hydroxybenzonitrile
3,5-ditertiaryamyl-4-methoxybenzonitrile
3,5-diisopropyl-4-ethylthiobenzonitrile
3,5-diethyl-4-isopropoxybenzonitrile
3-methyl-5-dodecyl-4-ethoxybenzonitrile
3-isopropyl-4-hydroxybenzonitrile-acetate
3,5-ditertiarybutyl-4-hydroxybenzonitrile acetate
3-tertiarylbutyl-4-hydroxybenzonitrile-propionate
3,5-ditertiaryamyl-4-hydroxybenzonitrile-butyrate The hydrocarbyl substituted 4-hydroxybenzonitriles of the present invention, the higher molecular weight amine salts thereof, including the imidazoline salts, as well as the alkyl esters and ethers thereof are all substantially insoluble in water. Thus it is desirable ot formulate these compounds into herbicidal compositions using inert diluents or extenders. Such inert ingredients include liquid agents, such as for example organic solvents and agricultural oils, emulsifying, penetrating or dispersing agents, and finely divided solids such as clays, diatomaceous earth, vermiculite, talc, walnut shell flour and calcium carbonate. The amount of active herbicidal constitutent in these formulations may range from as little as 0.5% to as much as 95% thereof depending upon the particular type of formulation utilized.

The alkali metal, ammonium and lower molecular weight amine salts possess sufficient water solubility so as to be capable of dissolution in aqueous media for direct spray application.

Typical examples of herbicidal formulations falling within the purview of this invention are presented below by way of illustration and are not intended in any way to be construed as limiting the scope of this invention except as defined in the appended claims. In all of the following examples the "parts" following the constituents of the formulation refers to parts by weight of that particular constituent.

EXAMPLE I

| | Parts |
|---|---|
| 3,5-ditertiarybutyl-4-hydroxybenzonitrile | 0.5 |
| Polyoxyethylene sorbitol tall oil condensate | 0.5 |
| Methylated naphthalene | 2 |

EXAMPLE II

| | Parts |
|---|---|
| 3,5-diisopropyl-4-hydroxybenzonitrile | 1 |
| Polyoxyethylene sorbitol tall oil condensate | 0.5 |
| Methylated naphthalene | 8.5 |

EXAMPLE III

| | Parts |
|---|---|
| 3,5-dicyclohexyl-4-hydroxybenzonitrile | 0.5 |
| Polyoxyethylene sorbitol tall oil condensate | 1.5 |
| Methylated naphthalene | 3 |

Formulations of Examples I to III can be diluted with water in all proportions to form stable oil-in-water emulsions suitable for spray application.

EXAMPLE IV

| | Parts |
|---|---|
| 3-methyl-5-ethyl-4-hydroxybenzonitrile | 60 |
| Sodium alkylnaphthylene sulfonate | 5 |
| Methyl cellulose | 1 |
| Attapulgite clay | 34 |

The above components are blended and micro-pulverized, then blended again to produce a free-flowing, wettable powder which may be dispersed in water for spray application.

EXAMPLE V

| | Parts |
|---|---|
| 3,5-diisopropyl-4-hydroxybenzonitrile | 70 |
| Diatomaceous silica | 20 |
| Polyoxyethylene ester of mixed resin and fatty acids | 10 |

The wettable powder formulation of Example V may be blended as described under Example IV, and is capable of admixture with water for high or low volume spray application.

EXAMPLE VI

| | Parts |
|---|---|
| 3,5-ditertiarybutyl-4-hydroxybenzonitrile | 20 |
| Attaclay | 30 |

EXAMPLE VII

| | Parts |
|---|---|
| 3,5-ditertiarybutyl-4-hydroxybenzonitrile acetate | 10 |
| Talc | 90 |

EXAMPLE VIII

| | Parts |
|---|---|
| 3,5-diisohexyl-4-hydroxybenzonitrile | 10 |
| Walnut shell flour | 90 |

EXAMPLE IX

| | Parts |
|---|---|
| 3,5-diisopropyl-4-hydroxybenzonitrile proprionate | 15 |
| Diatomaceous silica | 85 |

EXAMPLE X

| | Parts |
|---|---|
| 3-methyl-5-dodecyl-4-hydroxybenzonitrile | 10 |
| Vermiculite | 90 |

The powdered formulations of Examples VI to X may be applied to the locus to be treated by use of conventional dusting apparatus.

EXAMPLE XI

| | Parts |
|---|---|
| Lithium salt of 3,5-ditertiarybutyl-4-hydroxybenzonitrile | 5 |
| Refined kerosene | 2 |
| Dextrine (binding agent) | 20 |
| Goulac (dispersing agent) (sodium salt of lignin sulfonic acid) | 3 |
| Talc | 70 |

EXAMPLE XII

| | Parts |
|---|---|
| Sodium salt of 3-isopropyl-4-hydroxybenzonitrile | 9 |
| Refined kerosene | 4 |
| Dextrine (binding agent) | 20 |
| Goulac (dispersing agent) (sodium salt of lignin sulfonic acid) | 7 |
| Attaclay | 60 |

The formulations resulting from Examples XI and XII may be prepared simply by mixing the constituents with water to form a paste which is then extruded, dried and ground to any desirable particle size. Granular formulations having particle sizes between about 0.03 to 0.25 inch in diameter have been found to be particularly adaptable to agricultural equipment and to provide completely satisfactory results.

EXAMPLE XIII

| | Parts |
|---|---|
| 3,5-ditertiaryamyl-4-hydroxybenzonitrile butyrate | 1 |
| Isopropyl alcohol | 55 |
| Trichloromonofluoromethane | 20 |
| Dichlorodifluoromethane | 24 |

EXAMPLE XIV

| | |
|---|---|
| 3,5-diisopropyl-4-hydroxybenzonitrile acetate | 3 |
| Isopropyl alcohol | 33 |
| Hexylene glycol | 24 |
| Trichloromonofluoromethane | 20 |
| Dichlorodifluoromethane | 20 |

The formulations of Examples XIII and XIV may be used in aerosol dispersers. The formulation of Example XIV provides a more viscous solution thereby imparting a somewhat larger spray particle relative to the formulation resulting from Example XIII.

EXAMPLE XV

| | Parts |
|---|---|
| Mixed branched-chain amine having the molecular formula of $C_nH_{2n+1}NH_2$, wherein $n=12$–$14$, salts of 3,5-ditertiarybutyl-4-hydroxybenzonitrile | 30 |
| Polyoxyethylene sorbitol tall oil condensate | 25 |
| Methylated naphthalene | 45 |

EXAMPLE XVI

| | |
|---|---|
| Mixed branched-chain amine having the molecular formula of $C_nH_{2n+1}NH_2$ wherein $n=18$–$22$, salts of 3,5-ditertiarybutyl-4-hydroxybenzonitrile | 30 |
| Polyoxyethylene sorbitol tall oil condensate | 20 |
| Methylated naphthalene | 50 |

The formulations of Examples XV and XVI may be used in oil-in-water type emulsions. Other higher molecular weight aliphatic amines may also be used. The preferred amines are those which are highly branched and which have high molecular weights, particularly those wherein the total carbon chain is from about 7 to about 30.

EXAMPLE XVII

| | Parts |
|---|---|
| 3,5-diisopropyl-4-hydroxybenzonitrile | 35 |
| 2-isopropyl-1-(2-hydroxyethyl)-imidazoline | 24 |
| Benzene | 10 |
| Methylated naphthylene | 31 |

EXAMPLE XVIII

| | |
|---|---|
| 3,5-ditertiarybutyl-4-hydroxybenzonitrile | 35 |
| 2-s-butylimidazoline | 22 |
| Xylene | 15 |
| Methylated naphthylene | 28 |

The formulations of Examples XVII and XVIII may be diluted with oil or organic solvents, or they may be emulsified in water for spray application.

The preparation of the novel hydrocarbyl substituted hydroxybenzonitriles may be effected from the appropiate hydroxybenzaldehyde by reaction with hydroxylamine hydrochloride to form the corresponding hydroxybenzaldoxime which is dehydrated to the desired hydroxybenzonitrile. Procedures for preparing the hydrocarbyl substituted hydroxybenzonitriles of this invention are illustrated by the following examples, which although specifically directed to a few members of the class are, nevertheless, generally applicable.

EXAMPLE XIX

*Preparation of 3-ethyl-4-hydroxybenzonitriles*

The 3-hydrocarbyl-substituted-4-hydroxybenzonitriles, in general, are prepared by the method of Paschen, Ber., 24, 3673, as exemplified by the following:

A solution of 14.9 g. of 3-ethyl-4-hydroxybenzaldehyde and 40 ml. of acetic anhydride is heated at reflux for three hours. The excess acetic anhydride is destroyed by cautiously adding water to the hot solution. To this solution is added 10.4 g. of hydroxylamine hydrochloride, 12.3 g. of sodium acetate and the mixture is agitated and heated at 95° C. for one hour. Forty-five ml. of acetic anhydride is slowly added to this solution and then it is heated at reflux for 14 hours. The solution is concentrated under vacuum and the residue is poured into hot 5% sodium hydroxide solution. The solution is stirred for one half hour and then made acid by adding sulfuric acid. The product so-produced is isolated by extracting the mixture with several portions of ethyl ether. Crystallization of the desired 3-ethyl-4-hydroxybenzonitrile is effected from a concentrate of the combined ether extracts. The crystallized product is filtered and dried.

EXAMPLE XX

*Preparation of 3-cyclohexyl-4-hydroxybenzonitrile*

To a solution of 20.3 g. of 2-cyclohexyl-p-cresol dissolved in 250 ml. of acetic acid and 70 ml. of water, 13 ml. of bromine is added over a two hour period. The resulting slurry is poured into 300 ml. of warm water, the mixture stirred for two hours and then cooled to 5° C. The product is filtered off and washed with warm dilute acetic acid. The dried 3-cyclohexyl-4-hydroxybenzaldehyde is refluxed in 200 ml. of acetic anhydride for one hour. The excess acetic anhydride is destroyed by the cautious addition of water to the hot solution. Cool the solution, add 9.8 g. of hydroxylamine hydrochloride and 9.9 g. of sodium acetate and the resulting reaction mixture is refluxed for one hour. Fifty ml. of acetic anhydride is added, and the resulting mixture refluxed for 12 hours. The reaction mixture is concentrated by distillation under vacuum and the resulting oil is poured into a hot, dilute sodium hydroxide solution. The alkaline solution is stirred for ½ hour and then made acid by adding sulfuric acid, cooled, and the cold mixture is extracted several times with methylene chloride. The 3-cyclohexyl-4-hydroxybenzonitrile is isolated by concentrating the extracts to a residue.

SYNTHESIS OF 3,5-DIALKYL-4-HYDROXYBENZONITRILES

The 3,5-di-saturated hydrocarbyl-4-hydroxybenzonitriles, in general, may be prepared by the method of Wheland et al., J. Am. Chem. Soc., 70, 2492, 1948, as by the following:

EXAMPLE XXI

*Preparation of 3,5-dimethyl-4-hydroxybenzonitriles*

3,5-dimethyl-4-hydroxybenzaldoxime is prepared in the usual manner by reacting 3,5-dimethyl-4-hydroxybenzaldehyde with hydroxylamine hydrochloride in the presence of sodium hydroxide. The so-prepared oxime is isolated via a precepitation with carbon dioxide. The filtered and dried oxime is dehydrated in refluxing acetic anhydride to yield 3,5-dimethyl-4-acetoxy-benzonitrile which is isolated, hydrolyzed with dilute alkali to yield the desired 3,5-dimethyl-4-hydroxybenzonitrile.

EXAMPLE XXII

*Preparation of 3,5-diethyl-4-hydroxybenzonitrile*

A mixture of 4-allyloxy-3,5-diethylbenzamide and thionyl chloride is heated at reflux for two hours. The excess thionyl chloride is removed by distillation and the residue distilled under vacuum to obtain 4-alloxy-3,5- diethylbenzamide and 3,5-diethyl-4-hydroxybenzonitrile, the desired product being obtained from the higher boiling cut.

EXAMPLE XXIII

*Preparation of 3,5-dicyclohexyl-4-hydroxybenzonitrile*

To a solution of 27 g. of 2,6-dicyclohexyl-*p*-cresol in 275 ml. of acetic acid containing 75 ml. of water is added 13 ml. of bromine dropwise over a two hour period. The reaction mixture is stirred over a three hour period and poured into 200 ml. of warm water. This mixture is stirred for one hour, cooled to 5° C. and the product is filtered off. The 3,5-dicyclohexyl-4-hydroxybenzaldehyde is washed with 50% acetic acid and dried under vacuum. A mixture of 28 g. of the dried aldehyde and 75 ml. of acetic anhydride is heated at reflux for one hour. After the excess anhydride is destroyed by the cautious addition of water, add 10.4 g. of hydroxylamine hydrochloride and 12.3 g. of sodium acetate. The resulting mixture is warmed and stirred for one hour, 50 ml. of acetic anyhydride is added to this solution and the resulting mixture is heated at reflux for 14 hours. The refluxed mixture is concentrated to a low volume and poured into a warm 5% sodium hydroxide solution. The solution is acidified with sulfuric acid and the desired product is isolated by multiple extractions with ethyl ether. The combined ether extracts are dried over calcium chloride and concentrated to dryness. The 3,5-dicyclohexyl-4-hydroxybenzonitrile is isolated by sludging in cold methylene chloride and filtering.

Conversion of the hydrocarbyl-substituted-4-hydroxybenzonitriles into their corresponding alkanoyl derivatives may be accomplished by chemical reaction with the desired carboxylic acid anhydride in pyridine. For example the acetate, propionate and butyrate esters of the hydrocarbyl-substituted-4-hydroxybenzonitriles were prepared using acetic anhydride, propionic anhydride and butyric anhydride, respectively. Conversion of the hydrocarbyl substituted-4-hydroxybenzonitriles into their corresponding lower alkyl ethers may be accomplished by chemical reaction with the appropriate alkyl sulfate such as dimethyl sulfate according to techniques well known in the art.

Conversion of the hydrocarbyl-substituted-4-hydroxybenzonitriles to their above mentioned salts may be accomplished by admixing the required amounts of the respective agents in a suitable solvent system and warming the resulting mixtures. Preferably a slight excess of the ammonium, alkali metal, alkylamine, alkanolamine, imidazoline or other such reactant is used.

In order to illustrate the unexpected properties of high herbicidal activity and surprising selectivity of the compounds of the present invention there are presented below a series of test results which are presented solely for the purpose of understanding this invention and are in no way to be construed as in any way limiting the scope of this invention.

3.5-ditertiarybutyl-4-hydroxybenzonitrile was applied, in the form of its amine salt, said amine being a branched-chain primary amine having 12 to 14 total carbon atoms, to soil which has been seeded with eight common weed species representative of grasses and broad leaf types. The spraying was conducted immediately after planting of the weed seeds so that no vegetative growth was present on the treated plots at the time of application of the chemical. Three weeks following spray application the plots were inspected and the results are shown below in Table I wherein the herbicidal effectiveness is rated on a 0 to 10 scale, where 0 signifies no control, 5 is 50% control and 10 represents complete or 100% control. Although the active herbicidal agent which was applied was an amine salt of the phenol, the actual amount of the active herbicidal agent which was applied as the equivalent phenol is shown in the table.

TABLE I

| Plant | 3,5-ditertiarybutyl-4-hydroxybenzonitrile | |
|---|---|---|
| | 4 lbs./acre | 16 lbs./acre |
| Cheat grass | 10 | 10 |
| Foxtail | 9 | 10 |
| Barnyard Grass | 10 | 9 |
| Crabgrass | 10 | 10 |
| Johnson Grass | 10 | 10 |
| Pigweed | 10 | 10 |
| Lamb's-quarter | 8 | 10 |
| Chickweed | 9 | 10 |

The lithium salt of 3,5-ditertiarybutyl-4-hydroxybenzonitrile was applied to test plots which had been seeded with alfalfa and barley plus five common grasses which are problems in these crops. Application rates, calculated on the basis of the 3,5-ditertiarybuytl-4-hydroxybenzonitrile, were made at 3 and 6 lbs./acre and spraying was affected immediately after planting of the plant species so that no vegetative growth was present on the treated plots at the time of herbicide application. Eighteen days following spraying the plots were inspected and the results are recorded below in Table II wherein the same rating scale was employed as described above in Table I.

TABLE II

| Plant | Lithium salt of 3,5-ditertiarybutyl-4-hydroxybenzonitrile | |
|---|---|---|
| | 6 lbs./acre | 3 lbs./acre |
| Alfalfa | 0 | 0 |
| Barley | 0 | 0 |
| Cheatgrass | 10 | 10 |
| Foxtail | 10 | 10 |
| Crabgrass | 10 | 10 |
| Johnson Grass | 10 | 9.5 |
| Barnyard Grass | 10 | 9.5 |

The imidazoline salt of 3,5-ditertiarybutyl-4-hydroxybenzonitrile was sprayed on test plots which were freshly planted with corn, snap beans and soybean seeds which also had broadcast therein common grass and broad leaf weed seeds. The herbicidal agent was applied so as to obtain 2 and 6 lbs./acre of the active herbicide phenol, the application being made immediately following planting of the seeds. Observations were made three weeks following spraying and are recorded below in Table III wherein the same rating scale was employed as is described above in Table I.

TABLE III

| Plant | Imidazoline salt of 3,5-ditertiarybutyl-4-hydroxybenzonitrile | |
|---|---|---|
| | 6 lbs./acre | 2 lbs./acre |
| Corn | 1 | 0 |
| Snapbeans | 0 | 0 |
| Soybeans | 0 | 0 |
| Crabgrass | 10 | 10 |
| Chickweed | 10 | 9 |
| Barnyard Grass | 9 | 9 |
| Purslane | 10 | 9 |
| Smartweed | 10 | 9 |

3,5-ditertiarybutyl-4-methoxybenzonitrile was applied at the rate of 3 and 6 lbs./acre to test plots which were seeded with four economical crops and with six common weed species. Spray application was made immediately after planting of the seeds and ratings on the herbicidal effectiveness were made three weeks following spray application. The results of these ratings are shown below in Table IV wherein the same rating scale as reported above in Table I was utilized.

TABLE IV

| Plant | 3,5-ditertiarybutyl-4-methoxybenzonitrile | |
|---|---|---|
| | 6 lbs./acre | 3 lbs./acre |
| Safflower | 0 | 0 |
| Carrots | 0 | 0 |
| Barley | 1 | 0 |
| Tomato | 0 | 0 |
| Foxtail | 10 | 10 |
| Crabgrass | 10 | 10 |
| Cheatgrass | 9 | 9 |
| Witchgrass | 10 | 10 |
| Pigweed | 10 | 9 |
| Chickweed | 9 | 9 |

A strawberry bed which was infested with both broad leaf and narrow leaf weed seeds, including crabgrass, foxtail, cheatgrass, Johnson grass, pigweed, lambsquarter and curled dock was sprayed with the n-propionyl ester of 3,5-ditertiarybutyl-4-hydroxybenzonitrile at rates so as to produce 3 and 6 lbs./acre of the active nitrile herbicidal agent. Approximately three weeks after spray application inspection of the test plot showed from 80 to 85% control of both grasses and broad leafed weeds at the 3 lbs./acre rate and from 90 to 97% control of both broad leafed and narrow leafed weeds at the 6 lbs./acre rate with essentially no injury to the strawberry plants.

Paddy-rice was transplanted under field conditions into test plots wherein was seeded barnyard grass. Immmediately after transplanting of the rice and seeding of the grass the plots were sprayed with from 4 to 8 lbs./acre of 3,5-ditertiarybutyl-4-hydroxybenzonitrile. Two weeks following planting and spraying the plots were inspected and from 95 to 97% control of barnyard grass was obtained in the plots which had been sprayed with 4 to 8 lbs./acre of the active nitrile herbicidal agent. Substantially no injury was observed on the rice plants.

From the results reported above it is apparent that from 80 to 100% control for both broad leaf and narrow leaf plants, growing among economic crops, can be obtained with no injury to very slight injury occurring on the desirable plant species.

It is also readily apparent to one skilled in this art that certain molecular modifications of the hydroxybenzonitriles of this invention may be made without substantially altering the herbicidal property of the compound so modified. Specifically, substitution of the oxygen atom of the hydroxybenzonitrile by sulfur would be expected to result in corresponding mercaptobenzonitriles having essentially equivalent herbicidal activity, in view of the apparent equivalency of hydroxy and thio functional groups. Accordingly, the analogous 3-hydrocarbyl-4-mercaptobenzonitriles are deemed equivalents and as such are included within the concept of this application.

The preparation of 3-saturated hydrocarbyl and 3,5-disaturated hydrocarbyl-4-mercaptobenzonitriles may be effected by heating, under pressure, in the presence of a catalyst (such as aluminum turnings) thiophenol with appropriate alkene or cycloalkene (e.g. ethylene, propylene, isobutylene, butene diisobutylene, 1-decene, cyclopropene and cyclohexene) for several hours and then isolating the products by fractional distillation techniques.

The alkanoyl esters of the mercaptobenzonitriles may be effected by reacting the appropriate 3-hydrocarbyl or 3,5-dihydrocarbyl-5-thiohydroxybenzonitrile in pyridine or other suitable solvent with an acylating agent, such as for example an acid chloride, at room temperature, followed by the usual isolation and purification techniques.

We claim:
1. A method for controlling plant growth which comprises applying to the locus wherein the plant is grown, in amount sufficient to exert herbicidal action, a compound selected from the class consisting of 3-saturated hydrocarbyl-4-hydroxybenzonitrile, 3,5-di-saturated hydrocarbyl-4-hydroxybenzonitrile, wherein said hydrocarbyls contain from 1-12 carbon atoms, the agriculturally acceptable salts thereof, and the lower alkyl ethers and the lower alkanoyl esters of said hydroxybenzonitriles.

2. A method according to claim 1 utilizing a 3-saturated hydrocarbyl-4-hydroxybenzonitrile wherein the hydrocarbyl group contains 1-12 carbon atoms.

3. A method according to claim 1 utilizing a 3,5-disaturated hydrocarbyl-4-hydroxybenzonitrile wherein the hydrocarbyl groups contain 1-12 carbon atoms.

4. A method according to claim 1 utilizing a member of the group consisting of the agriculturally acceptable salts, the lower alkanoyl esters and the lower alkyl ethers of a 3-saturated hydrocarbyl-4-hydroxybenzonitrile wherein the hydrocarbyl group contains 1-12 carbon atoms.

5. A method according to claim 1 utilizing a member of the group consisting of the agriculturally acceptable salts, the lower alkanoyl esters and the lower alkyl ethers of a 3,5-di-saturated hydrocarbyl-4-hydroxybenzonitrile wherein the hydrocarbyl group contains 1-12 carbon atoms.

6. A method according to claim 1 utilizing a member of the group consisting of 3,5-ditertiarybutyl-4-hydroxybenzonitrile, the agriculturally acceptable salts thereof, and the lower alkanoyl esters and lower alkyl ethers of said hydroxybenzonitrile.

7. A method according to claim 1 wherein the lithium salt of 3,5-ditertiarybutyl-4-hydroxybenzonitrile is utilized.

References Cited

FOREIGN PATENTS 902,586   8/1962   Great Britain.
906,118   9/1962   Great Britain.

OTHER REFERENCES

Cohen: "Chemical Abstracts," vol. 52, 8097i, (1958).
Bielig et al.: "Chemical Abstracts," vol. 52, 15466e (1958).
Stroh et al.: "Chemical Abstracts," vol. 55, 21023f (1961).
Harvel: "Chemical Abstracts," vol. 44–4503b (1950), 4.
Richtzenham: "Chemical Abstracts," vol. 40, 5412 (1946).
Nature, vol. 200, No. 4901, October 1963, pp. 28 and 29.

LEWIS GOTTS, *Primary Examiner.*

JAMES O. THOMAS, JR., *Examiner.*

A. J. ADAMCIK, *Assistant Examiner.*